US010768189B2

(12) United States Patent
Imai et al.

(10) Patent No.: US 10,768,189 B2
(45) Date of Patent: Sep. 8, 2020

(54) AUTOMATIC ANALYSIS APPARATUS

(71) Applicant: HITACHI HIGH-TECHNOLOGIES CORPORATION, Tokyo (JP)

(72) Inventors: Kenta Imai, Tokyo (JP); Yoshinori Negishi, Tokyo (JP); Toshinari Sakurai, Tokyo (JP); Kyoko Imai, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 317 days.

(21) Appl. No.: 15/111,195

(22) PCT Filed: Jan. 9, 2015

(86) PCT No.: PCT/JP2015/050423
§ 371 (c)(1),
(2) Date: Jul. 13, 2016

(87) PCT Pub. No.: WO2015/111441
PCT Pub. Date: Jul. 30, 2015

(65) Prior Publication Data
US 2016/0334428 A1    Nov. 17, 2016

(30) Foreign Application Priority Data

Jan. 27, 2014   (JP) ................................ 2014-012066

(51) Int. Cl.
*G01N 35/00* (2006.01)
*G01N 27/416* (2006.01)
(Continued)

(52) U.S. Cl.
CPC ..... *G01N 35/0098* (2013.01); *G01N 27/4163* (2013.01); *G01N 35/1095* (2013.01); *G01N 27/49* (2013.01)

(58) Field of Classification Search
None
See application file for complete search history.

(56) References Cited

U.S. PATENT DOCUMENTS 4,713,347 A    12/1987   Mitchell et al.
5,538,687 A *   7/1996   Kotzan ................. G01N 21/69
                                                         250/361 C
(Continued)

FOREIGN PATENT DOCUMENTS

JP    62-124455 A    6/1987
JP    1-250864 A    10/1989
(Continued)

OTHER PUBLICATIONS

Machine generated translation of JP 2006-133137, published May 25, 2006 (Year: 2006).*

(Continued)

*Primary Examiner* — Kathryn Wright
(74) *Attorney, Agent, or Firm* — Mattingly & Malur, PC (57) ABSTRACT

When a sample of biological origin in an aqueous solution is used as the measurement medium in analysis using an electrochemical process, and a voltage of +1.2 V or greater (with saturated silver-silver chloride electrode potential as a reference) is applied, there are instances in which bubbles are observed to be produced within the flow cell, due to an electrolysis reaction deriving from the measurement buffer. There is a possibility that bubbles produced on the electrode will cover the electrode surface, reducing the effective surface area of the electrode. Also, the distribution of magnetic particles captured on the electrode will be disturbed by the gas produced thereby, lowering the reproducibility of the results of the analysis. Deaeration of the measurement medium prior to introduction of the measurement medium into the detector minimizes the effects of (Continued)

bubble production in degrading the analytical capability makes it possible to carry out highly sensitive electrochemical analysis.

8 Claims, 8 Drawing Sheets

(51) Int. Cl.
*G01N 27/49* (2006.01)
*G01N 35/10* (2006.01)

(56) References Cited

U.S. PATENT DOCUMENTS

| | | |
|---|---|---|
| 2002/0166764 A1 | 11/2002 | MacPhee |
| 2007/0078369 A1* | 4/2007 | Tamari ............ A61M 1/3621 604/6.15 |
| 2010/0299072 A1 | 11/2010 | Kamata et al. |

FOREIGN PATENT DOCUMENTS

| | | | |
|---|---|---|---|
| JP | 8233772 | * | 9/1996 |
| JP | 2001-305136 A | | 10/2001 |
| JP | 2002-536660 A | | 10/2002 |
| JP | 2003-247967 A | | 9/2003 |
| JP | 2004-151107 A | | 5/2004 |
| JP | 2006-133137 A | | 5/2006 |
| JP | 2011-039070 A | | 2/2011 |
| JP | 2013-142664 A | | 7/2013 |
| WO | WO-8910551 A1 | * | 11/1989 |
| WO | 2008/133332 A1 | | 11/2008 |

OTHER PUBLICATIONS

Machine generated English translation of JP 2004-151107, published May 27, 2004. (Year: 2004).*
Extended European Search Report received in corresponding European Application No. 15741107.5 dated Sep. 20, 2017.
International Search Report of PCT/JP2015/050423 dated Apr. 21, 2015.

* cited by examiner

| MEASUREMENT ALARM DISPLAY SCREEN | | |
|---|---|---|
| DATE/TIME (801) | ALARM ITEM (802) | RECOMMENDATION (803) |
| YYYY/MM/DD | EXCESSIVE DISSOLVED OXYGEN | CHECK THE FILTER. |
| | | |
| | | |
| | | |
| | | |
| | | |

CLOSE

AUTOMATIC ANALYSIS APPARATUS

TECHNICAL FIELD

The present invention relates to an automatic analyzer that analyzes an organism-derived sample such as blood and urine highly sensitively, and in particular, relates to an automatic analyzer using an electrochemical sensor that uses an electrochemical technique for detection.

BACKGROUND ART

As a technique to measure the concentration of a substance contained in an organism-derived sample such as blood and urine, an electrochemical technique that detects a signal related to an electron exchange between a target substance and a working electrode is known. As an electrochemical technique, an electrochemical sensor using a technique (amperometric method) of detecting a current generated between the working electrode and a counter electrode when, for example, the target substance is oxidized or reduced on the working electrode is disclosed. As such a sensor, for example, a glucose sensor that measures the concentration of glucose based on a current response obtained by oxidizing hydrogen peroxide using generated hydrogen peroxide when glucose is oxidized by glucose oxidase is known. Hereinafter, the present invention will be described based on the amperometric method, but the application of the present invention is not limited to the amperometric method and the present invention can be applied to any method of detecting a response when a voltage is applied to the working electrode.

To analyze an organism-derived sample highly sensitively by applying an electrochemical technique, it is necessary to curb the influence of a large amount of coexisting components contained in the organism-derived sample on a detection reaction. PTL 1 describes a method of using magnetic particles as an example of the method of selectively separating a component to be analyzed from coexisting components by an analyzer using the amperometric method.

CITATION LIST

Patent Literature

PTL 1: JP 2011-39070 A

SUMMARY OF INVENTION

Technical Problem

In an automatic analyzer using the amperometric method, a measurement sample is introduced into a detection unit (flow cell) for measurement and magnetic particles bound to a substance to be measured are trapped by a magnetic field. In this state, a buffer for measurement is injected and a voltage is applied while the detection unit is filled with the buffer for measurement to measure a current value generated by the application of the voltage. After the measurement is completed, the electrode is cleaned by introducing a cleaning fluid.

On the other hand, when platinum, gold, or a carbon based electrode of glassy carbon or the like is used for the working electrode, it is necessary to apply the voltage of +1.2 V (saturated silver-silver chloride electrode potential reference and also applies below) or more for measurement. If a high voltage is applied to the buffer for measurement, the generation of an air bubble in the flow cell may be recognized due to an electrolytic reaction derived from the buffer for measurement. The air bubble generated on the electrode could decrease the effective area of the electrode by covering the electrode surface. In addition, the distribution of magnetic particles trapped on the electrode by a generated gas could be disturbed, leading to degraded reproducibility of analysis results.

Solution to Problem

The configuration of the present invention to solve the above problems is as described below. Namely, a means for introducing a measurement liquid containing a component to be measured bound to magnetic particles and a measurement solvent into a detection unit, a working electrode provided in the detection unit and in which platinum, gold, or carbon occupies 50% or more of an elemental composition of a surface thereof, a voltage applying means for applying a voltage of +1.2 V or more in a saturated silver-silver chloride electrode potential reference to the working electrode, a magnetic field applying means for applying a magnetic field such that the component to be measured bound to the magnetic particles is supplemented on the working electrode, a degassing means for degassing a gas from the measurement solvent before being introduced into the detection unit, and a detection means for detecting the component to be measured by applying the voltage by the voltage applying means in a state in which the measurement solvent degassed by the degassing means is introduced into the detection unit are provided.

Advantageous Effects of Invention

According to the present invention, a response signal accompanying oxidation or reduction of a substance to be analyzed can efficiently be detected and therefore, a highly sensitive automatic analyzer can be implemented.

DESCRIPTION OF EMBODIMENTS

Hereinafter, a preferred example of the automatic analyzer to carry out the present invention will be described.

First, the analysis method of an organism-derived sample using the electrochemical measuring method such as the amperometric method will be described.

In the amperometric method, IR drops due to an electrochemical reaction are generated in a two-electrode system of a working electrode and a counter electrode and so the voltage of the working electrode is not constant and a stable current response cannot be obtained. Thus, a three-electrode system in which a reference electrode indicating a reference voltage is added to the two electrodes of the working electrode that generates a detection current and the counter electrode is frequently used for the purpose of continuing to apply a constant voltage to the working electrode. By using a circuit called potentiostat for the three-electrode system, a constant voltage can be continued to apply to between the working electrode and the reference electrode.

As the material of the working electrode and the counter electrode, platinum or gold as noble metals or a carbon based electrode of glassy carbon or the like is frequently used from the viewpoint of the stability of electrode. As the material of the reference electrode, a silver-silver chloride electrode is frequently used.

To analyze an organism-derived sample highly sensitively by applying an electrochemical technique, it is necessary to curb the influence of a large amount of coexisting components contained in the organism-derived sample on a detection reaction. For example, in an immunity analysis in which cancer markers, and antigens and antibodies in infectious disease viruses, hormones and the like are to be analyzed, while the concentration of a component to be measured in the serum is generally a trace amount on the order fmol/L to nmol/L, a relatively large amount of protein component of about 70 g/L coexists in the serum. Thus, a portion of the coexisting component may affect the electrochemical reaction to detect a target substance. In such a case, means of selectively separating the target component from the coexisting component are taken before a detection process by using a substance that selectively binds to the component to be analyzed. In the immunity analysis, for example, the analysis is frequently conducted by following the processes as shown in 1) to 4) below using magnetic particles.

1) A measurement reagent containing magnetic particles modifying an antibody selectively binding to an antigen of the substance to be measured in the sample is allowed to react with the antigen to bind the substance to be measured and magnetic particles by an antigen-antibody reaction.

2) The sample is introduced into the detection unit and a permanent magnet is used to trap magnetic particles on the working electrode.

3) A buffer for measurement to be a solvent during measurement is introduced into the detection unit to discharge a solvent containing the coexisting component in the sample that is not bound to magnetic particles out of the system.

4) The substance to be measured that is bound to magnetic particles is allowed to react on the working electrode to obtain a response depending on the concentration of the substance to be measured.

In such a high-sensitivity automatic analyzer of electrochemical flow cell type, it is necessary to continuously and repeatedly perform a series of processes such as introducing a measurement sample into the detection unit, separating the coexisting substance by discharging a sample liquid while magnetic particles bound to the substance to be measured are supplemented, introducing a buffer for measurement into the flow cell, analyzing the substance to be measured by applying a voltage, and then washing away the substance to be measured by introducing a cleaning liquid into the flow cell for the purpose of automatically conducting the analysis repeatedly. To implement high throughput by efficiently performing the repeated operation, it is suitable to a mode in which respective containers of the measurement sample, the buffer for measurement, and the cleaning liquid are installed in a specific area of the analyzer and each liquid is sucked in turn using a liquid suction mechanism that introduces each liquid into the detection unit.

Figure 1:
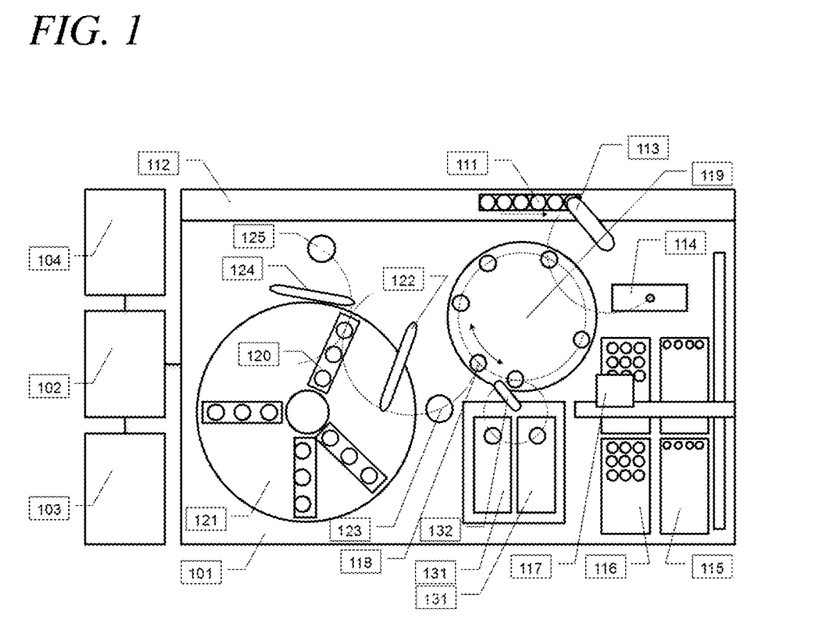
FIG. 1 is a schematic diagram when an automatic analyzer in Example 1 of the present invention is viewed from above.

FIG. 1 is a schematic diagram of an automatic analyzer using the electrochemical measuring method.

The automatic analyzer according to the present embodiment includes an analysis unit 101 to perform an analysis operation, a control unit 102 to control the analyzer, an input unit 103 to input information by the user into the analyzer, and a display unit 104 to display information for the user. Incidentally, the input unit 103 and the display unit 104 may be the same unit and an example thereof is a touch panel monitor.

The analysis unit 101 in the automatic analyzer according to the present embodiment includes a transport mechanism 112 to transport a sample container 111 containing a sample to a sample dispensing position, a sample probe 113 to dispense the sample, a chip attachment/detachment unit 114 to attach a disposable chip for sample probe to the sample probe or detach the chip therefrom, a chip magazine 115 to supply the disposable chip, a reaction container magazine 116 to supply a reaction container, a chip/reaction container transport mechanism 117 to transport the disposable chip and the reaction container, a reaction container holding portion 119 including a plurality of openings 118 capable of holding a reaction liquid in the reaction container at a constant temperature, a reagent disk 121 to hold a reagent container 120 containing a measurement reagent, a reagent dispensing probe 122 to dispense the measurement reagent to the reaction container holding portion, a reagent probe cleaning portion 123 to clean the reagent dispensing probe with water and a cleaning liquid, a magnetic particle stirring mechanism 124 to stir the measurement reagent containing magnetic particles before the reagent being dispensed, a magnetic particle stirring mechanism cleaning portion 125 to clean the magnetic particle stirring mechanism with water and the cleaning liquid, a detection unit 131 to detect a reaction (details will be described below), and a reaction container for detection unit transport mechanism 132 to transport a reaction container to the detection unit. A plurality of bottles to supply common reagents such as a buffer for measurement, a cleaning liquid, and a probe cleaning liquid is stored inside the analyzer for each reagent including reserved bottles and each reagent is supplied to each mechanism through a reagent tube inserted into each bottle (details will be described below).

The automatic analyzer according to the present embodiment includes two units of the detection unit 131 for the purpose of improving analysis efficiency. The number of detection units does not affect the effect of the present invention and thus, the present invention can similarly be applied to an automatic analyzer including a different number of detection units. A supply unit 201 of liquids holding a cleaning liquid container 211, a buffer for measurement container 221 and the like is provided in a portion of the detection unit 131.

Next, an overview of an analysis process will be provided. First, a reaction container is set up in the reaction container holding portion by the reaction container magazine 116. Also, a measurement reagent containing magnetic particles is stirred by the magnetic particle stirring mechanism 124 to suspend magnetic particles in the reagent container. Next, the measurement reagent containing magnetic particles is dispensed into the reaction container by the reagent dispensing probe 122 and mixed to allow a reaction to occur for a fixed time. Then, the sample container 111 containing the sample is transported to the sample dispensing position by the transport mechanism 112 and the sample is dispensed into the reaction container on the reaction container holding portion by the sample probe 113 to which a disposable chip is attached by the chip attachment/detachment unit 114. Then, the liquid in the reaction container is transported to the detection unit by the reaction container for detection unit transport mechanism 132 so that a reaction is detected by the detection unit. Then, an analysis result calculated from reaction data is displayed in the display unit 103.

Example 1

Figure 2:
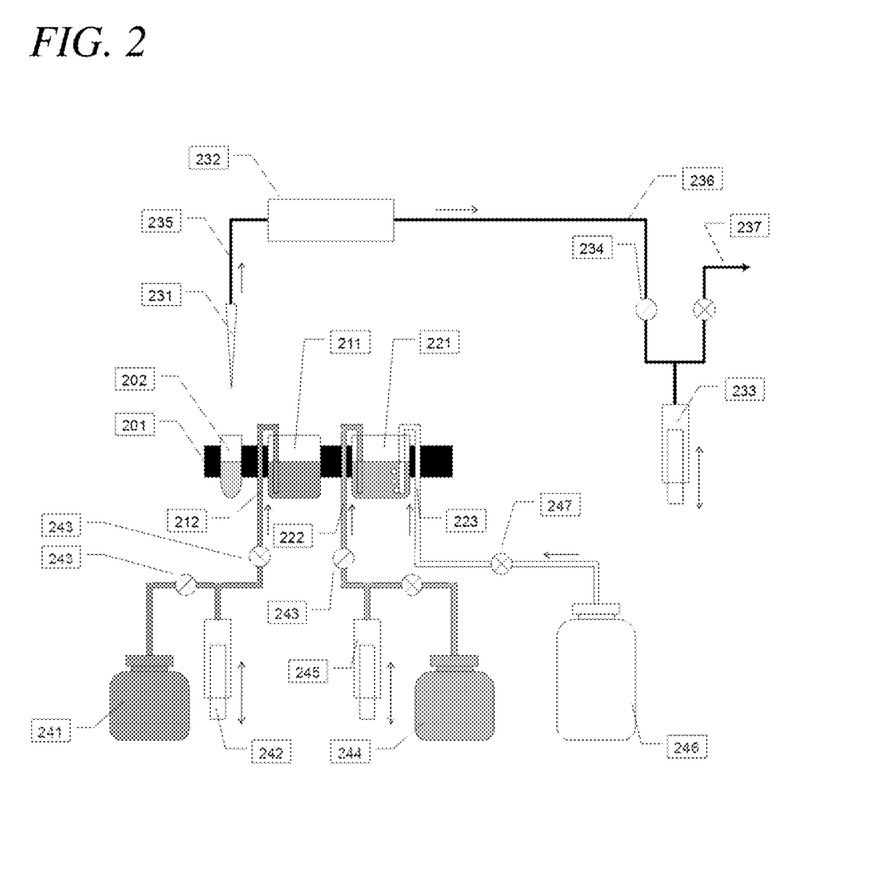
FIG. 2 is a diagram schematically showing a detection unit channel and a supply unit of each liquid in Example 1 of the present invention.

FIG. 2 is a diagram schematically showing the structure of the channel of the detection unit 131 and the supply unit of each liquid in the present example.

The supply unit 201 of liquids includes a portion 202 that holds a sample container transported from the reaction container holding portion by the reaction container for detection unit transport mechanism 132, a cleaning liquid container 211 to hold a cleaning liquid, a cleaning liquid supply channel 212 to supply the cleaning liquid from a cleaning liquid bottle 241, a buffer for measurement container 221 to hold a buffer for measurement as a measurement solvent, a buffer for measurement supply channel 222 to supply the buffer for measurement from a buffer for measurement bottle 244, and a purging gas introduction channel 223 to degas the air in the buffer for measurement by purging of a different kind of an inert gas.

The detection unit includes a nozzle 231 as a means for sucking a liquid from each liquid container and introducing the liquid into an electrochemical sensor unit 232 described below, the electrochemical sensor unit 232 that implements electrochemical detection, a syringe 233 to generate power that sucks a liquid, a switching valve 234 to switch the channel, a channel 235 that connects the nozzle and the electrochemical sensor unit, a channel 236 that connects the electrochemical sensor unit and the syringe, and a channel 237 to connect the syringe and a drain (waste liquid discharge unit) (not shown).

The detection unit channel and the supply unit of each liquid according to the present example include a cleaning liquid sending mechanism 242 to send the cleaning liquid from the cleaning liquid bottle 241 to the cleaning liquid container 211, a valve 243 to switch the channel when a liquid is sent, a buffer for measurement sending mechanism 245 to send the buffer for measurement from the buffer for measurement bottle 244 to the buffer for measurement container 221, an inert gas container 246 to store an inert gas, and an inert gas supply valve 247 to control the introduction of gas by an inert gas.

When a buffer for measurement is supplied to the buffer for measurement container 221 by the buffer for measurement supply mechanism 222, the purging gas introduction mechanism 223 continuously supplies an inert gas to the buffer for measurement. Due to the purging gas introduction mechanism 223, the buffer for measurement can be introduced into the detection unit while the concentration of dissolved oxygen therein is reduced. The purging gas is not particularly limited if the gas does not contain oxygen or hydrogen and is electrochemically inert, but it is preferable to use nitrogen or argon. By purging dissolved oxygen in the buffer for measurement by the inert gas, the amount of generated air bubbles can sufficiently be curbed when compared with a buffer for measurement that is not purged even if an electrochemical reaction derived from the buffer for measurement occurs.

Figure 3:
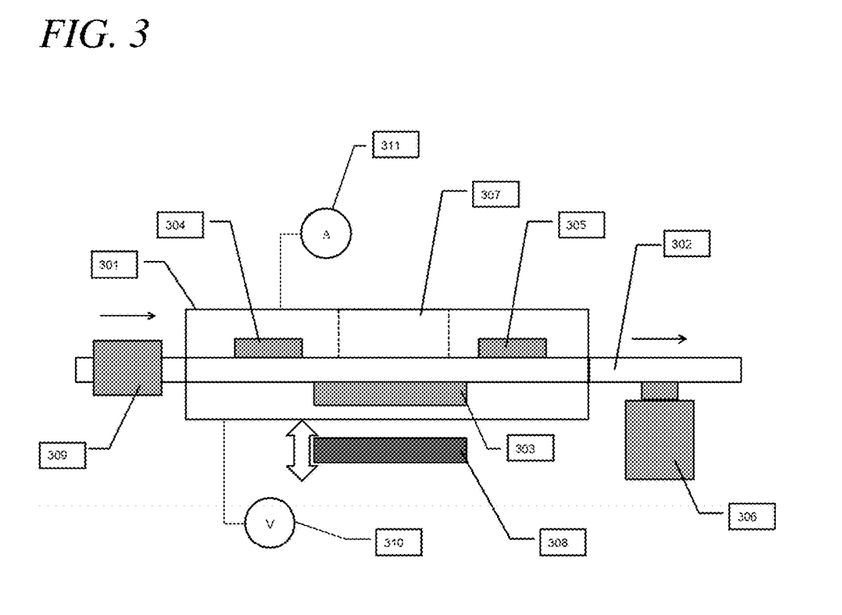
FIG. 3 is a diagram schematically showing the detection unit in Example 1 of the present invention.

FIG. 3 is a diagram schematically showing an example of the detection unit according to the present example.

The detection unit according to the present example includes a base material 301, a channel 302, a working electrode 303 made of platinum, counter electrodes 304, 305 made of platinum, a reference electrode 306 made of silver-silver chloride, and a permanent magnet and a drive mechanism 308 thereof that applies a magnetic field to trap magnetic particles on the working electrode. The detection unit may also include a dissolved oxygen analyzer 309 to measure dissolved oxygen in the buffer for measurement. The working electrode is made of platinum in the present example, but is not limited to such an example and the elemental composition of the electrode surface may be gold or a carbon based electrode may be used. In this case, one of platinum, gold, and carbon is preferably contained 50% or more.

In the detection process according to the present example, first the measurement sample is sucked from the sample container by the nozzle 231 and introduced into the detection unit and the substance to be measured that is bound to magnetic particles is trapped on the working electrode 303 by the permanent magnet 308. The permanent magnet 308 is provided by a magnet drive mechanism such that the magnet can approach and move away from the detection unit 301.

Then, a degassed buffer for measurement is introduced onto the working electrode in the detection unit to discharge a coexisting component that is not bound to magnetic particles out of the system. At this point, if the dissolved oxygen analyzer 309 is used, the degassed state of the buffer for measurement can be checked. Then, a predetermined voltage is applied to between the working electrode 303 and the counter electrodes 304, 305 by a voltage applying means 310 such as a voltage variable power supply or a constant power supply to measure a current response generated between the working electrode and the counter electrodes using an ammeter 311. By introducing a cleaning liquid into the detection unit after the measurement is completed, magnetic particles are removed and the inside of the detection unit is cleaned. The detection unit may include an opening 307 to optically check the supplemented state of magnetic particles. In this case, an optical detection system to check the distribution of magnetic particles on the working electrode through the opening 307 is provided near the detection unit.

A case when the component to be measured that is oxidized at about +1.3 V is detected by applying the present example will be described. When, for example, the concentration of oxalic acid in urine is measured to conduct diagnosis of sickness such as urinary calculus, it is necessary to apply a voltage of about 1.3 V to detect an oxidation current of oxalic acid. Hereinafter, a case when analyzed using a purged buffer for measurement and a case when analyzed using a non-purged buffer for measurement are compared.

In Comparative Example, an air bubble of oxygen or the like derived from the buffer for measurement starts to be generated in a region in which the applied voltage exceeds about +1.1 V. With the generation of air bubbles on the surface of the working electrode, magnetic particles trapped on the electrode may be removed from the electrode, starting a disturbance of the distribution of magnetic particles. At this point, if an attempt is made to measure by applying the voltage of about +1.3 V, reproducibility of the obtained response current value cannot be ensured. Further, the response current value obtained during measurement decreases because a portion of the electrode surface is covered with air bubbles, which makes detection with accuracy difficult.

On the other hand, when the present example is applied, the buffer for measurement is purged before being introduced into a flow cell and thus, even if the voltage of about +1.3 V is applied, less air bubbles are generated in the flow cell and the distribution of magnetic particles is not disturbed. Therefore, the current derived from the component to be measured can be detected with excellent reproducibility.

Figure 4:
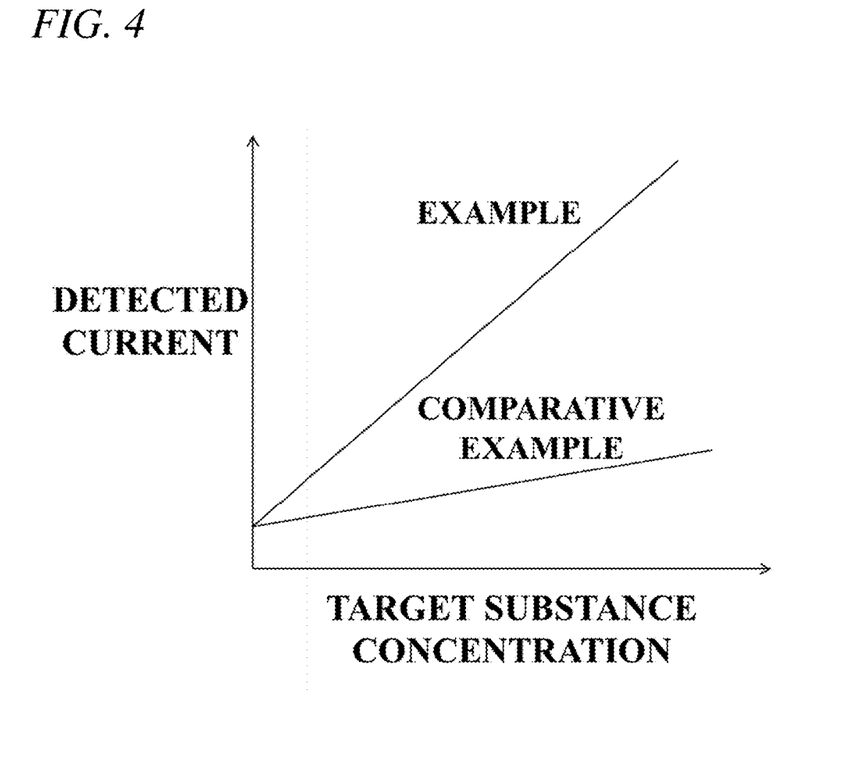
FIG. 4 is a diagram schematically showing the relationship between the concentration of a substance to be measured and a response current in Example 1 and Comparative Example of the present invention.

FIG. 4 is a diagram schematically showing the relationship (working curve) between the amount of the target substance and the detected current value corresponding to the presence/absence of a purging process. When the present example is applied, the detection of a current derived from the component to be measured is easier than when Comparative Example is applied and thus, the gradient of the working curve shown in FIG. 5 increases, which makes it possible to measure the concentration of the target substance more sensitively.

Example 2

Figure 5:
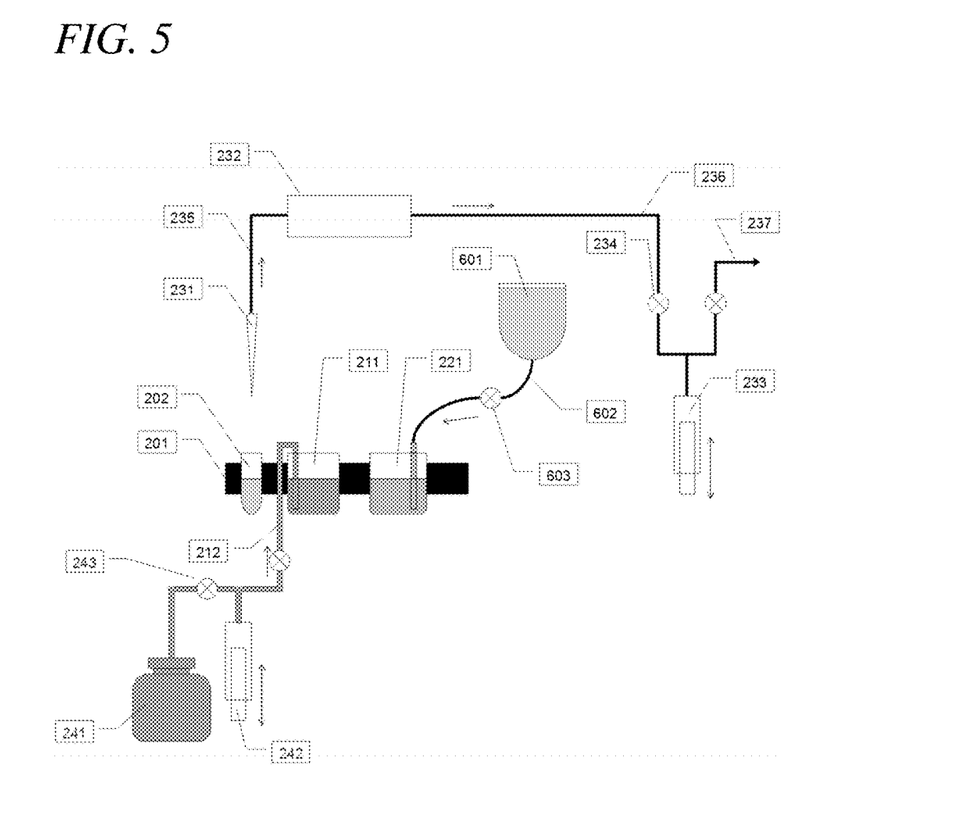
FIG. 5 is a diagram schematically showing the detection unit channel and the supply unit of each liquid in Example 2 of the present invention.

FIG. 5 is a diagram schematically showing an example of the detection unit channel and the supply unit of each liquid according to Example 2. The detection unit channel and the supply unit of each liquid according to Example 2 include a buffer for measurement bottle 601 in a transfusion bag shape, a channel 602 to connect the buffer for measurement bottle 601 and the buffer for measurement container 221, and a valve 603 to adjust the flow rate of the buffer for measurement supplied from the buffer for measurement bottle 601 to the buffer for measurement container 221.

The supply unit 201 of liquids includes the portion 202 that holds a sample container transported from the reaction container holding portion, the cleaning liquid container 211 to hold a cleaning liquid, the cleaning liquid supply channel 212 to supply the cleaning liquid from the cleaning liquid bottle 241, and the buffer for measurement container 221 to hold a buffer for measurement. The detection unit includes the nozzle 231 to suck a liquid from each liquid container, the electrochemical sensor unit 232 that implements electrochemical detection, the syringe 233 to generate power that sucks a liquid, the switching valve 234 to switch the channel, the channel 235 that connects the nozzle and the electrochemical sensor unit, the channel 236 that connects the electrochemical sensor unit and the syringe, and the channel 237 to connect the syringe and a drain.

The detection unit channel and the supply unit of each liquid according to the present example include the cleaning liquid sending mechanism 242 to send the cleaning liquid from the cleaning liquid bottle 241 to the cleaning liquid container 211 and the valve 243 to switch the channel when a liquid is sent. The valve 603 to adjust the flow rate of the buffer for measurement may use, like sending the cleaning liquid described in the present example, a system that uses a liquid sending mechanism and a channel switching valve. In this case, the number of components is relatively large, but a liquid can be sent with accuracy in a wider range of the flow rate.

By using the buffer for measurement bottle 601 in a transfusion bag shape, the buffer for measurement can be stored in a vacuum packed state and further, when the buffer for measurement is consumed, the packed state can be continued by the shrinkage of the bottle and thus, the buffer for measurement can be introduced in the detection unit in a degassed state by swiftly introducing the buffer for measurement into the detection unit after the buffer for measurement being supplied to the buffer for measurement container 221. The channel 602 to supply the buffer for measurement in the buffer for measurement bottle 601 in a transfusion bag shape may directly connected to the channel that connects the nozzle 231 and the electrochemical sensor unit 232. By configuring as described above, the buffer for measurement can be sent to the electrochemical sensor unit 232 in a degassed state.

Accordingly, the effect just like in Example 1 can be obtained. The overall configuration and the effect of the automatic analyzer are just like in Example 1 and thus, the description thereof is omitted.

Example 3

Figure 6:
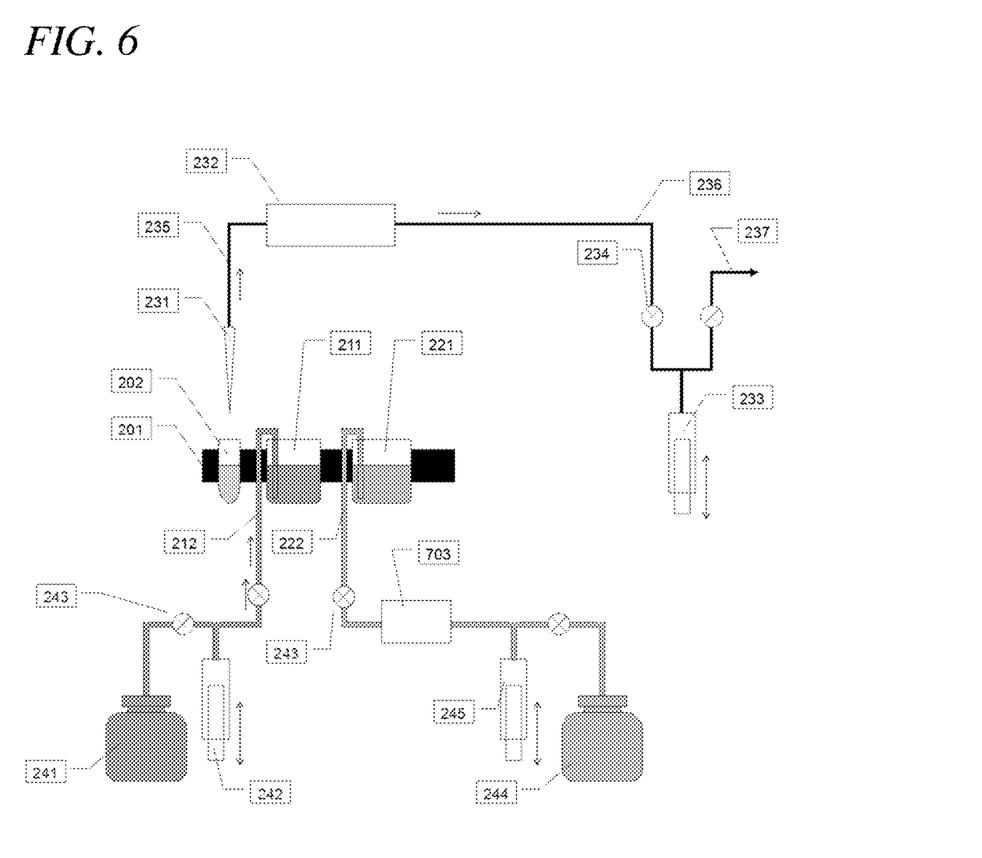
FIG. 6 is a diagram schematically showing the detection unit channel and the supply unit of each liquid in Example 3 of the present invention.

FIG. 6 is a diagram schematically showing an example of the detection unit channel and the supply unit of each liquid according to Example 3. The detection unit channel and the supply unit of each liquid according to Example 3 include a degasifier 703 to degas a gas from the buffer for measurement between the buffer for measurement bottle 244 and the buffer for measurement container 221. A container containing a hollow filament type nonporous gas-liquid separation film that separates a gas in a liquid and allows the gas to pass (degasifier generally known as a degasser) or a degasifier that degases a gas by decompressing a measurement solvent is suitably used as the degasifier.

A gas can be degassed before the buffer for measurement is supplied to the buffer for measurement container by using the degasifier like in the present example and therefore, the buffer for measurement can be introduced into the detection unit in a degassed state by swiftly introducing the buffer for measurement into the detection unit after the buffer for measurement being supplied to the buffer for measurement container 221. Also in the present example, the effect just like in Example 1 can be obtained. The overall configuration and the effect of the automatic analyzer are just like in Example 1 and thus, the description thereof is omitted.

The supply unit 201 of liquids includes the portion 202 that holds a sample container transported from the reaction container holding portion, the cleaning liquid container 211 to hold a cleaning liquid, the cleaning liquid supply channel 212 to supply the cleaning liquid from the cleaning liquid bottle 241, the buffer for measurement container 221 to hold a buffer for measurement, and the buffer for measurement supply channel 222 to supply the buffer for measurement from the buffer for measurement bottle 244. The detection unit includes the nozzle 231 to suck a liquid from each liquid container, the electrochemical sensor unit 232 that implements electrochemical detection, the syringe 233 to generate power that sucks a liquid, the switching valve 234 to switch the channel, the channel 235 that connects the nozzle and the electrochemical sensor unit, the channel 236 that connects the electrochemical sensor unit and the syringe, and the channel 237 to connect the syringe and a drain. The detection unit channel and the supply unit of each liquid according to the present example include the cleaning liquid sending mechanism 242 to send the cleaning liquid from the cleaning liquid bottle 241 to the cleaning liquid container 211 and the valve 243 to switch the channel when a liquid is sent.

Example 4

Figure 7:
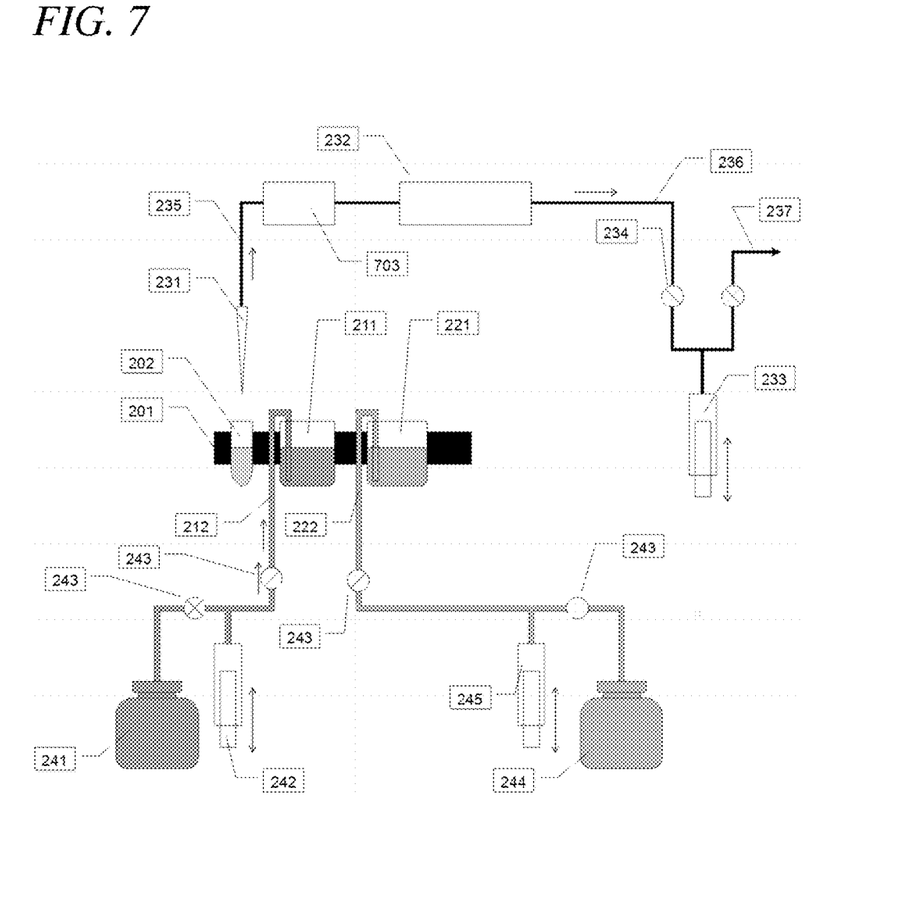
FIG. 7 is a diagram schematically showing the detection unit channel and the supply unit of each liquid in Example 4 of the present invention.

FIG. 7 is a diagram schematically showing an example of the detection unit channel and the supply unit of each liquid according to Example 4. The detection unit channel and the supply unit of each liquid according to Example 4 include the degasifier 703 to degas a gas from the buffer for measurement as shown in Example 3. However, the detection unit channel and the supply unit of each liquid shown in Example 4 include the degasifier 703 between the nozzle 231 to suck a liquid and the detection unit 232. A container containing a hollow filament type nonporous gas-liquid separation film that separates a gas in a liquid and allows the gas to pass (degasser) or a degasifier that degases a gas by decompressing a measurement solvent is suitably used as the degasifier. The overall configuration and the effect of the automatic analyzer are just like in Example 1 and thus, the description thereof is omitted.

The supply unit 201 of liquids includes the portion 202 that holds a sample container transported from the reaction container holding portion, the cleaning liquid container 211 to hold a cleaning liquid, the cleaning liquid supply channel 212 to supply the cleaning liquid from the cleaning liquid bottle 241, the buffer for measurement container 221 to hold a buffer for measurement, and the buffer for measurement supply channel 222 to supply the buffer for measurement from the buffer for measurement bottle 244. The detection unit includes the nozzle 231 to suck a liquid from each liquid container, the electrochemical sensor unit 232 that implements electrochemical detection, the syringe 233 to generate power that sucks a liquid, the switching valve 234 to switch the channel, the channel 235 that connects the nozzle and the electrochemical sensor unit, the channel 236 that connects the electrochemical sensor unit and the syringe, and the channel 237 to connect the syringe and a drain. The detection unit channel and the supply unit of each liquid according to the present example include the cleaning liquid sending mechanism 242 to send the cleaning liquid from the cleaning liquid bottle 241 to the cleaning liquid container 211 and the valve 243 to switch the channel when a liquid is sent.

When the degasifier is used like in the present example, a gas can be degassed from the buffer for measurement immediately before the buffer for measurement is sent to the detection unit and therefore, degassing can advantageously be performed efficiently.

Figure 8:
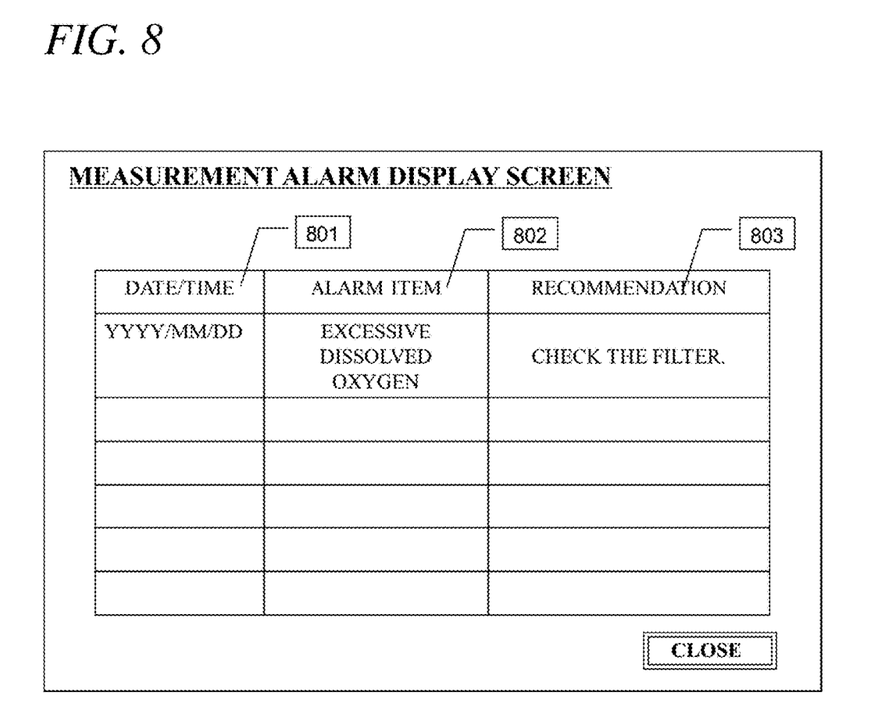
FIG. 8 is a diagram showing an example of a measurement alarm display screen applicable to Examples 1 to 4 in common.

FIG. 8 is a diagram schematically showing a measurement alarm display screen applicable to Examples 1 to 3 in common. The measurement alarm display screen includes an alarm date/time display unit 801, an alarm description display unit 802, and an alarm recommendation display unit 803.

If dissolved oxygen exceeds a predetermined amount due to a problem of insufficient supply of an inert gas, filter degradation of the degasifier or the like when, as described above, a degassed state of the buffer for measurement is checked using the dissolved oxygen analyzer 309, an alarm can be added to measurement results or measurements can be canceled by outputting a measurement alarm so that more reliable measurements can be made.

REFERENCE SIGNS LIST

101: analysis unit, 102: control unit, 103: input unit, 104: display unit, 111: sample container, 112: sample container transport mechanism, 113: sample probe, 114: disposable chip attachment/detachment unit, 115: disposable chip magazine, 116: reaction container magazine, 117: disposable chip/reaction container transport mechanism, 118: opening, 119: reaction container holding portion, 120: measurement reagent container, 121: measurement reagent disk, 122: reagent dispensing probe, 123: reagent probe cleaning portion, 124: magnetic particle stirring mechanism, 125: magnetic particle stirring mechanism cleaning portion, 131: detection unit, 132: reaction container for detection unit transport mechanism, 201: liquid supply unit, 202: sample container holding portion, 211: cleaning liquid container, 212: cleaning liquid supply channel, 221, 701: buffer for measurement container, 222: buffer for measurement supply channel, 223: purging gas introduction channel, 231: liquid sucking nozzle, 232: electrochemical sensor unit, 233: liquid sucking syringe, 234: channel switching valve, 235, 236, 237, 602, 704, 705: channel, 241: cleaning liquid bottle, 242: cleaning liquid sending mechanism, 244: buffer for measurement bottle, 245: buffer for measurement sending mechanism, 246: inert gas container, 247: inert gas supply valve, 301: detection unit base material, 302: detection unit channel, 303: working electrode made of platinum, 304, 305: counter electrode made of platinum, 306: reference electrode made of silver-silver chloride, 307: opening, 308: permanent magnet and drive mechanism thereof, 309: dissolved oxygen analyzer, 310: voltage applying means, 311: current measuring means, 601: buffer for measurement bottle in a transfusion bag shape, 603: flow rate adjusting valve, 702: buffer for measurement supply nozzle, 703: degasifier, 801: alarm date/time display unit, 802: alarm description display unit, 803: alarm recommendation display unit

The invention claimed is:

1. An electrochemical automatic analyzer to measure a component bound to magnetic particles in a measurement liquid, the electrochemical automatic analyzer comprising:
   a first container which holds the measurement liquid;
   a measurement solvent supply bottle which holds a measurement solvent;
   a detector including a channel, one or more counter electrodes made of platinum, a working electrode in which platinum or gold occupies 50% or more of an elemental composition of a surface thereof, a reference electrode made of silver-silver chloride, and a magnet configured to apply a magnetic field;
   a nozzle and a syringe connected to the channel of the detector and configured to introduce the measurement liquid from the first container and the measurement solvent from the measurement solvent supply bottle into the detector;
   an inert gas container which holds an inert gas, an introduction channel connected between the inert gas container and the measurement solvent supply bottle and a supply valve which are configured to supply the inert gas into the measurement solvent in the measurement solvent supply bottle and degas a gas from the measurement solvent in the measurement supply bottle;
   a dissolved oxygen analyzer in the channel of the detector to measure a degassed state of the measurement solvent;
   a power supply; and
   a controller programmed to:
      control the nozzle and the syringe to introduce the measurement liquid into the channel of the detector and control the magnet to trap the magnetic particles on the working electrode;

control the supply valve to supply the inert gas into the measurement solvent while controlling the nozzle and the syringe to introduce the measurement solvent into the channel of the detector;

control the power supply to apply a voltage between the working electrode and the reference electrode and control the power supply to apply a predetermined voltage between the working electrode and the counter electrodes to detect a current corresponding to a concentration of the component in a state in which the measurement solvent is introduced into the channel of the detector, wherein the component is a chemical substance that is oxidized by applying a voltage of +1.2 V or more between the working electrode and the reference electrode, and wherein a measurement alarm is output when dissolved oxygen measured by the dissolved oxygen analyzer exceeds a predetermined amount.

2. The electrochemical automatic analyzer according to claim 1, wherein the inert gas is an electrochemically inert gas.

3. The electrochemical automatic analyzer according to claim 2, wherein the inert gas is nitrogen or argon.

4. The electrochemical automatic analyzer according to claim 1, wherein the degasifier removes a dissolved gas in the measurement solvent by using a gas-liquid separation film.

5. The electrochemical automatic analyzer according to claim 1, wherein the degasifier removes a dissolved gas in the measurement solvent by decompressing the measurement solvent.

6. The electrochemical automatic analyzer according to claim 1, wherein the current corresponds to an oxidation current of oxalic acid.

7. The electrochemical automatic analyzer according to claim 1, wherein the voltage applied between the working electrode and the reference electrode is +1.3 V.

8. The electrochemical automatic analyzer according to claim 1, wherein the chemical substance is oxalic acid.

* * * * *